(12) United States Patent
Chassoulier

(10) Patent No.: US 7,911,100 B2
(45) Date of Patent: Mar. 22, 2011

(54) DUAL-STAGE CENTERING MAGNETIC BEARING

(75) Inventor: Damien Chassoulier, Mouans-Sartoux (FR)

(73) Assignee: Thales (FR)

( * ) Notice: Subject to any disclaimer, the term of this patent is extended or adjusted under 35 U.S.C. 154(b) by 264 days.

(21) Appl. No.: 12/265,810

(22) Filed: Nov. 6, 2008

(65) Prior Publication Data

US 2009/0126519 A1 May 21, 2009

(30) Foreign Application Priority Data

Nov. 16, 2007 (FR) .................................. 07 08054

(51) Int. Cl.
*H02K 7/09* (2006.01)
(52) U.S. Cl. ............................................. 310/90.5
(58) Field of Classification Search ............... 310/90.5
See application file for complete search history.

(56) References Cited

U.S. PATENT DOCUMENTS

| 4,470,644 A | | 9/1984 | Weisser | |
|---|---|---|---|---|
| 4,483,570 A | * | 11/1984 | Inoue | 310/90.5 |
| 4,634,191 A | | 1/1987 | Studer | |
| 5,763,972 A | * | 6/1998 | Bernus et al. | 310/90.5 |
| 5,818,137 A | * | 10/1998 | Nichols et al. | 310/90.5 |
| 5,880,546 A | * | 3/1999 | Marroux et al. | 310/90.5 |
| 7,112,903 B1 | * | 9/2006 | Schob | 310/90.5 |

FOREIGN PATENT DOCUMENTS

| EP | 0644346 A1 | 3/1995 |
|---|---|---|
| EP | 0724086 A1 | 7/1996 |
| EP | 0816701 A1 | 1/1998 |
| EP | 0844410 A1 | 5/1998 |
| FR | 2797477 A1 | 2/2001 |
| FR | 2797478 A1 | 2/2001 |
| JP | 5884221 | 5/1983 |

* cited by examiner

*Primary Examiner* — Burton Mullins
(74) *Attorney, Agent, or Firm* — Lowe Hauptman Ham & Berner, LLP

(57) ABSTRACT

The present invention relates to a magnetic centering structure, and more particularly a structure of a centering magnetic bearing intended notably for space applications. The solution proposed in the present patent is suited to the centerers used on gyroscopic wheels and actuators. The main originality of the invention is the proposal of a dual-stage magnetic bearing structure. According to the implementation chosen, this invention presents the significant advantage of an improvement in terms of radial bulk.

8 Claims, 2 Drawing Sheets

DUAL-STAGE CENTERING MAGNETIC BEARING

RELATED APPLICATIONS

The present application is based on, and claims priority from, French Application Number 07 08054, filed Nov. 16, 2007, the disclosure of which is hereby incorporated by reference herein in its entirety.

FIELD OF THE INVENTION

The present invention relates to a magnetic centering structure, and more particularly to a structure of a centering magnetic bearing intended notably for space applications.

The solution proposed in the present document is suited to the centerers used on gyroscopic wheels and actuators.

BACKGROUND OF THE INVENTION

Various magnetic centering structures are known. They generally rely on the use of permanent magnets, windings, ferromagnetic armatures and, usually, an electrical excitation circuit making it possible to control the magnetic fluxes generated by the windings. The role of a centering magnetic bearing is to centre a mobile body with respect to a reference body. Several motions of the mobile body with respect to the reference body are thus prevented, or controlled. If an orthogonal reference frame is considered, consisting of three axes X-X, Y-Y, and Z-Z, and centred at the centre of the device comprising the magnetic centerer, the mobile body and the reference body; the Z-Z axis constituting an axis of revolution of the device, and the X-X and Y-Y axes defining a mid-plane of the device, there then exist three translations in relation to the axes X-X, Y-Y and Z-Z and three rotations about these same three axes.

Various types of centering magnetic bearings make it possible to control the three translations.

Additionally, the mobile body retains at least one degree of freedom with respect to the reference body, generally a rotation around the Z-Z axis; in this case, the mobile body is called a rotor and the reference body a stator.

Usually, the tiltings in relation to the other axes can on the other hand only be controlled in a passive manner.

Most centering magnetic bearings therefore make it possible to control the three translations of the mobile body with respect to the reference body: in relation to one active axis and two passive axes, in relation to two active axes and one passive axis, or in relation to three active axes. However, they exhibit, in the state of the art, the drawback of significant radial bulk. Specifically, windings are wound around vertical axes, parallel to the Z-Z axis, at the periphery of the bearing; the return of these windings does not serve to generate additional magnetic flux: the presence of this return is merely a physical necessity and increases the radial bulk.

Additionally, with the aim of allowing the control of tiltings about the X-X and Y-Y axes, several technologies have been developed. Those described in French patents n°2797477 and n°2797478 may be cited by way of examples. These magnetic bearings, which make it possible to control tiltings in relation to the X-X and Y-Y axes, still exhibit very significant radial bulk.

Another recent technology is taught in European patent EP0724086, which presents a magnetic bearing arranged on two stages, each stage comprising windings and magnets making it possible to control distinct magnetic fluxes at the level of the air gaps situated respectively above and below the mid-plane of the magnetic bearing. This technology makes it possible to control micro-tiltings of the magnetic bearing, optionally with a significant torque. However, the drawback related to the radial bulk of the magnetic bearing is still present, the windings being wound around vertical axes of revolution. Nevertheless, the present invention borrows the idea of arranging the magnetic bearing on two stages.

To summarize, the centering magnetic bearings of the state of the art all exhibit at least the drawback of significant radial bulk.

The present invention proposes a solution making it possible to solve this drawback through the use of a particular dual-stage magnetic bearing structure, making it possible to ensure performance comparable with contemporary centering magnetic bearings, but with reduced radial bulk.

SUMMARY OF THE INVENTION

For this purpose, the subject of the invention is a magnetic bearing allowing the centering of a mobile body with respect to a reference body and comprising:
  a first ferromagnetic armature secured to the mobile body, with symmetry of revolution, and containing a plurality of annularly distributed magnets,
  a second and a third ferromagnetic armature, secured to the reference body, with symmetry of revolution, and supporting a plurality of annularly distributed windings,
  an excitation circuit making it possible to apply an excitation current to the said windings,
  the magnetic bearing having symmetry of revolution and exhibiting an axis of revolution and a height, and additionally possessing a centre, belonging to the axis of revolution and situated halfway up the height of the said magnetic bearing, as well as a first and a second orthogonal, reference axis intersecting at the centre of the magnetic bearing, the said first and second reference axes defining a mid-plane of the magnetic bearing orthogonal to the axis of revolution of the said magnetic bearing, characterized in that:
    the magnetic bearing is arranged on two stages called the upper stage and lower stage, the first, second and third armatures consequently comprising two stages, and the plurality of magnets being composed of a first and a second set of magnets, the upper stage containing the first set of annularly distributed magnets and the lower stage containing the second set of annularly distributed magnets, the first and second sets of magnets exhibiting directions of magnetization that are parallel to the axis of revolution of the magnetic bearing and of opposite senses, the first, second and third ferromagnetic armatures being designed in such a way that three annular air gaps separate the first armature from the second armature on the one hand, and that three annular air gaps separate the first armature from the third armature on the other hand; and in that,
    each winding is wound around an axis of revolution of the winding contained in the mid-plane of the magnetic bearing and passing approximately through the centre of the magnetic bearing, this arrangement of the windings making it possible to utilize the entirety of the windings present in the bearing and, in cooperation with the plurality of magnets, to control the centering of the mobile body with respect to the reference body for translational motions in relation to the first and second reference axes and, in a passive manner, in relation to the axis of revolution of the magnetic bearing.

Advantageously, the windings are distributed in diametrically opposed pairs and are offset by about 90° with respect to one another.

Advantageously, the magnets are distributed in a homogeneous manner, offset by a few degrees with respect to one another, about 10° for example, in the form of sectors or in discrete form, as in a barrel.

Advantageously, the mobile body is a wheel, termed a wheel having magnetic bearings.

Advantageously, the magnetic bearing is mounted on a gimbal, constituting a gyroscopic actuator intended to be mounted on a satellite.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
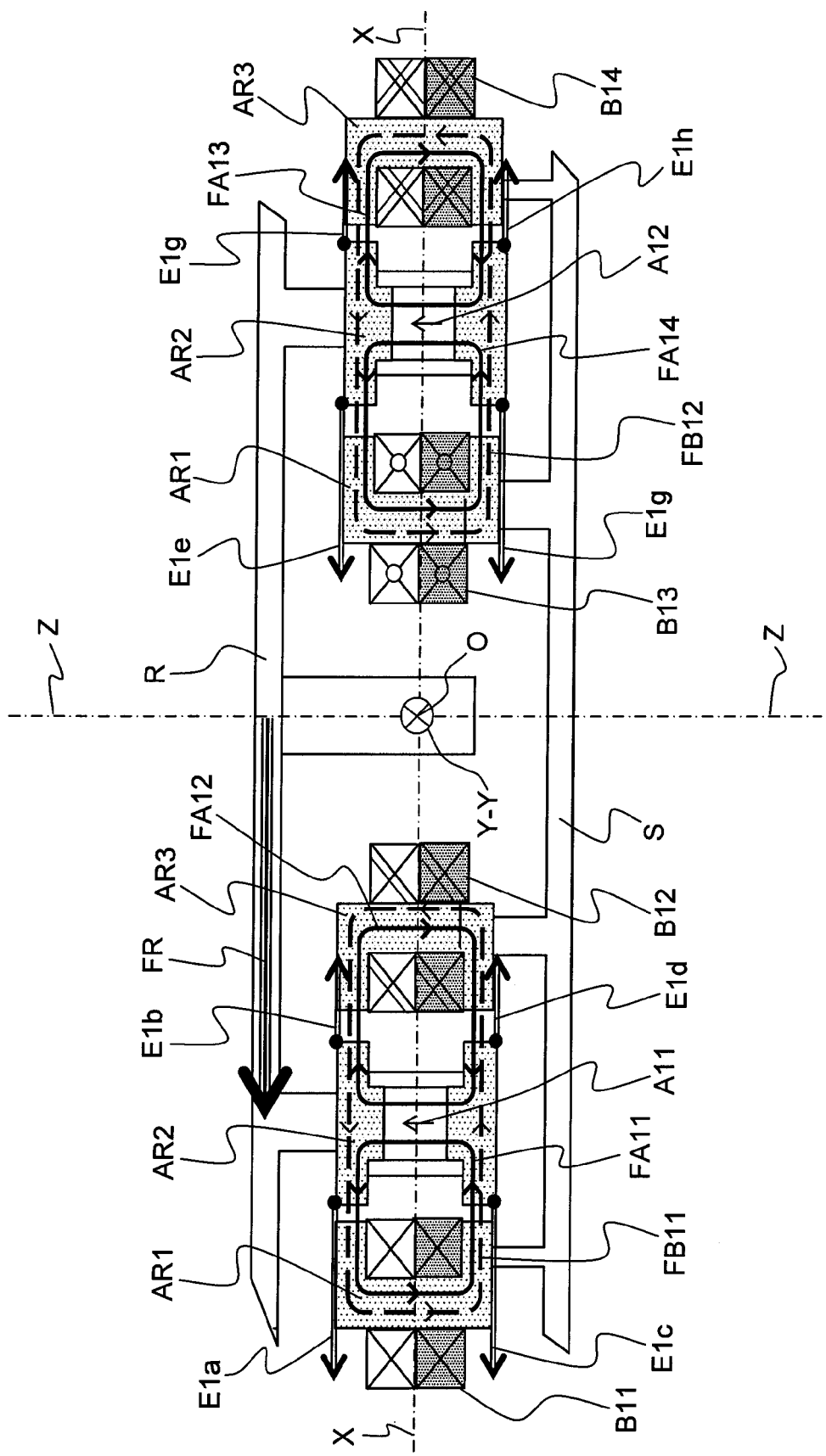
FIG. 1: the diagram of a conventional centering magnetic bearing, according to the state of the art.

FIG. 1 presents a diagram of a centering magnetic bearing structure of the state of the art. This magnetic bearing, with centre O, has symmetry of revolution about its axis of revolution Z-Z. It allows the free rotation about the Z-Z axis of the mobile body, or rotor, R with respect to the reference body, or stator, S. The reference axes X-X and Y-Y intersect at the centre of the bearing O and define a mid-plane of the magnetic bearing.

This bearing comprises three ferromagnetic armatures AR1, AR2 and AR3, again having symmetry of revolution about Z-Z. It is noted that annular air gaps separate the armature AR2 from the armature AR1 on the one hand and from the armature AR3 on the other hand.

The central armature AR2 comprises a plurality of magnets A11, A12 distributed annularly in a homogeneous manner; these magnets A11, A12 exhibit the same direction of magnetization. The armatures AR1 and AR3 support a plurality of windings B11, B12, B13, B14 also distributed annularly and exhibiting an axis of revolution parallel to the axis of revolution of the bearing Z-Z.

The magnets A11, A12 generate first magnetic fluxes FA11, FA12, FA13, FA14 while the coils generate second magnetic fluxes FB11, FB12. On account of the interaction between these magnetic fluxes, in the event of off-centering of the mobile body R with respect to the reference body S, loads E1a to E1h are exerted at the level of the air gaps and the resultant of these loads, FR, helps to recentre or to amplify the off-centering of the rotor R with respect to the stator S.

By applying an appropriate excitation current to the windings B11, B12, B13, B14 with the aid of an excitation circuit, it is possible to control the centering of the mobile body R with respect to the reference body S.

This structure makes it possible to control the translations in relation to the X-X and Y-Y axes. The Z-Z axis is for its part stabilized in a passive manner, just like the tiltings.

Additionally, the returns of the windings B11, B12, B13, B14, situated at the periphery of the bearing do not make it possible to generate magnetic fluxes directly. Their presence is a physical necessity; it increases the radial bulk of the device.

To summarize, this centering magnetic bearing structure, characteristic of the state of the art, makes it possible to highlight the defect of most known technologies: the significant radial bulk. As it has been previously explained, the device of European patent EP0724086, making it possible to transmit significant torques when tilting, also retains the defect of significant radial bulk.

Figure 2:
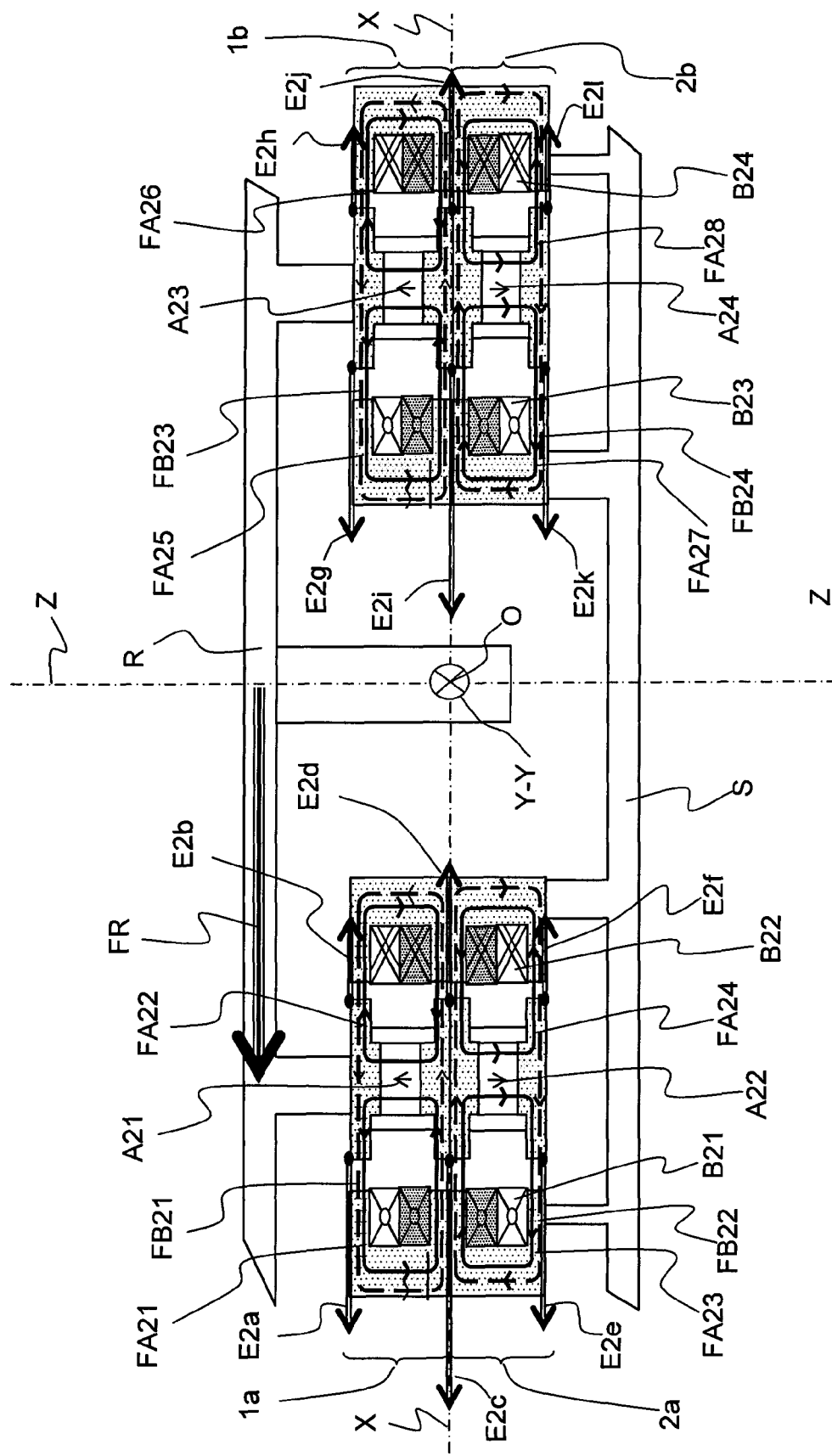
FIG. 2: the diagram of a dual-stage centering magnetic bearing according to the invention.

FIG. 2 illustrates the possibility of reducing the radial bulk of a centering magnetic bearing by virtue of a dual-stage structure constituting the core of the present invention.

The centering magnetic bearing is therefore here arranged on two stages. The upper stage 1a-1b and the lower stage 2a-2b. The windings B21, B22, B23 and B24 are wound around their axis of revolution contained in the mid-plane of the magnetic bearing, defined by the X-X and Y-Y axes, and passing through the centre O of the bearing. These windings B21, B22, B23 and B24 can be rendered redundant. The arrangement of the magnetic bearing on two stages brings about additionally the production of three annular air gaps separating the ferromagnetic armature AR2 from the ferromagnetic armature AR1 on the one hand and of three other annular air gaps separating the ferromagnetic armature AR2 from the ferromagnetic armature AR3 on the other hand.

Each of the two stages also comprises a set of annularly distributed magnets A21 to A24. These magnets A21 to A24 exhibit directions of magnetization that are parallel to the axis of revolution of the bearing, Z-Z, and of opposite senses if they do not belong to the same stage.

These windings and these magnets thus positioned generate magnetic fluxes. The windings create fluxes FB21, FB22, FB23, FB24, on the two stages of the bearing. Thus, the entirety of the windings is useful for generating the global magnetic flux created within the bearing: the effectiveness of the magnetic bearing is therefore increased for equivalent mass or bulk. It is also possible to reduce, for equivalent performance, the radial bulk, that is to say the bulk in relation to the plane defined by X-X and Y-Y, with respect to that of the magnetic bearing of FIG. 1.

Additionally, the magnets generate magnetic fluxes FA21 to FA28. The whole set of magnetic fluxes created within the magnetic bearing by the coils and the magnets then behave as has been previously described with regard to FIG. 1: the loads E2a to E2l being exerted at the levels of the air gaps give rise to the resulting force FR, which helps to recentre or to amplify the off-centering of the rotor R with respect to the stator S.

Moreover, by applying an appropriate excitation current to the windings B11, B12, B13, B14 with the aid of an excitation circuit, it is still possible to control the centering of the mobile body R with respect to the reference body S.

To summarize, by virtue of an arrangement on two stages, the radial bulk of the centering magnetic bearing is reduced or its effectiveness is increased.

This constitutes the main originality of the invention. Once implemented, the magnetic bearing according to the invention presents the advantage of an improvement in terms of bulk or efficiency.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A magnetic bearing allowing the centering of a mobile body with respect to a reference body comprising:
    a first ferromagnetic armature secured to the mobile body, with symmetry of revolution, and having a plurality of annularly distributed magnets,
    a second and a third ferromagnetic armature, secured to the reference body, with symmetry of revolution, and supporting a plurality of annularly distributed windings,
    an excitation circuit to apply an excitation current to said windings,
the magnetic bearing having symmetry of revolution and exhibiting an axis of revolution and a height, and additionally possessing a center, belonging to the axis of revolution and situated half way up the height of said magnetic bearing, as well as a first and a second orthogonal, reference axis intersecting at the centre of the magnetic bearing, said first and second reference axes defining a mid-plane of the magnetic bearing orthogonal to the axis of revolution of said magnetic bearing, wherein:
    the magnetic bearing is arranged on an upper stage and a lower stage, the first, second and third armatures consequently comprising two stages, and the plurality of magnets composed of a first and a second set of magnets, the upper stage having the first set of annularly distributed magnets and the lower stage having the second set of annularly distributed magnets, the first and second sets of magnets exhibiting directions of magnetization that are parallel to the axis of revolution of the magnetic bearing and of opposite senses, the first, second and third ferromagnetic armatures being designed in such a way that three annular air gaps separate the first armature from the second armature, and that three annular air gaps separate the first armature from the third armature; and wherein,
    each winding is wound around an axis of revolution of the winding in the mid-plane of the magnetic bearing and passing approximately through the centre of the magnetic bearing, this arrangement of the windings making it possible to utilize the entirety of the windings present in the bearing and, in cooperation with the plurality of magnets, to control the centering of the mobile body with respect to the reference body for translational motions in relation to the first and second reference axes and, in a passive manner, in relation to the axis of revolution of the magnetic bearing.

2. The magnetic bearing according to claim 1, wherein the windings are distributed in diametrically opposed pairs and are offset by about 90° with respect to one another.

3. A gyroscopic actuator comprising a gimbal and a magnetic bearing according to claim 2 mounted on the gimbal, the gyroscopic actuator intergrated into a satellite.

4. The magnetic bearing according to claim 1, wherein the magnets are distributed in a homogeneous manner, offset by a few degrees with respect to one another, about 10°, in the form of sectors or in discrete form, as in a barrel.

5. A gyroscopic actuator comprising a gimbal comprising and a magnetic bearing according to claim 4 mounted on the gimbal, the said gyroscopic actuator intergrated into a satellite.

6. The magnetic bearing according to claim 1, wherein the mobile body is a wheel having magnetic bearings.

7. A gyroscopic actuator comprising a gimbal and a magnetic bearing according to claim 6 mounted on the gimbal, the said gyroscopic actuator integrated into a satellite.

8. A gyroscopic actuator comprising a gimbal and a magnetic bearing according to claim 1 mounted on the gimbal, the gyroscopic actuator integrated into a satellite.

* * * * *